Oct. 25, 1966  R. E. JONES  3,280,933
DISC BRAKE ARRANGEMENT FOR INDUSTRIAL TRUCKS
Filed Oct. 16, 1964  3 Sheets-Sheet 1

Oct. 25, 1966    R. E. JONES    3,280,933
DISC BRAKE ARRANGEMENT FOR INDUSTRIAL TRUCKS
Filed Oct. 16, 1964    3 Sheets-Sheet 2

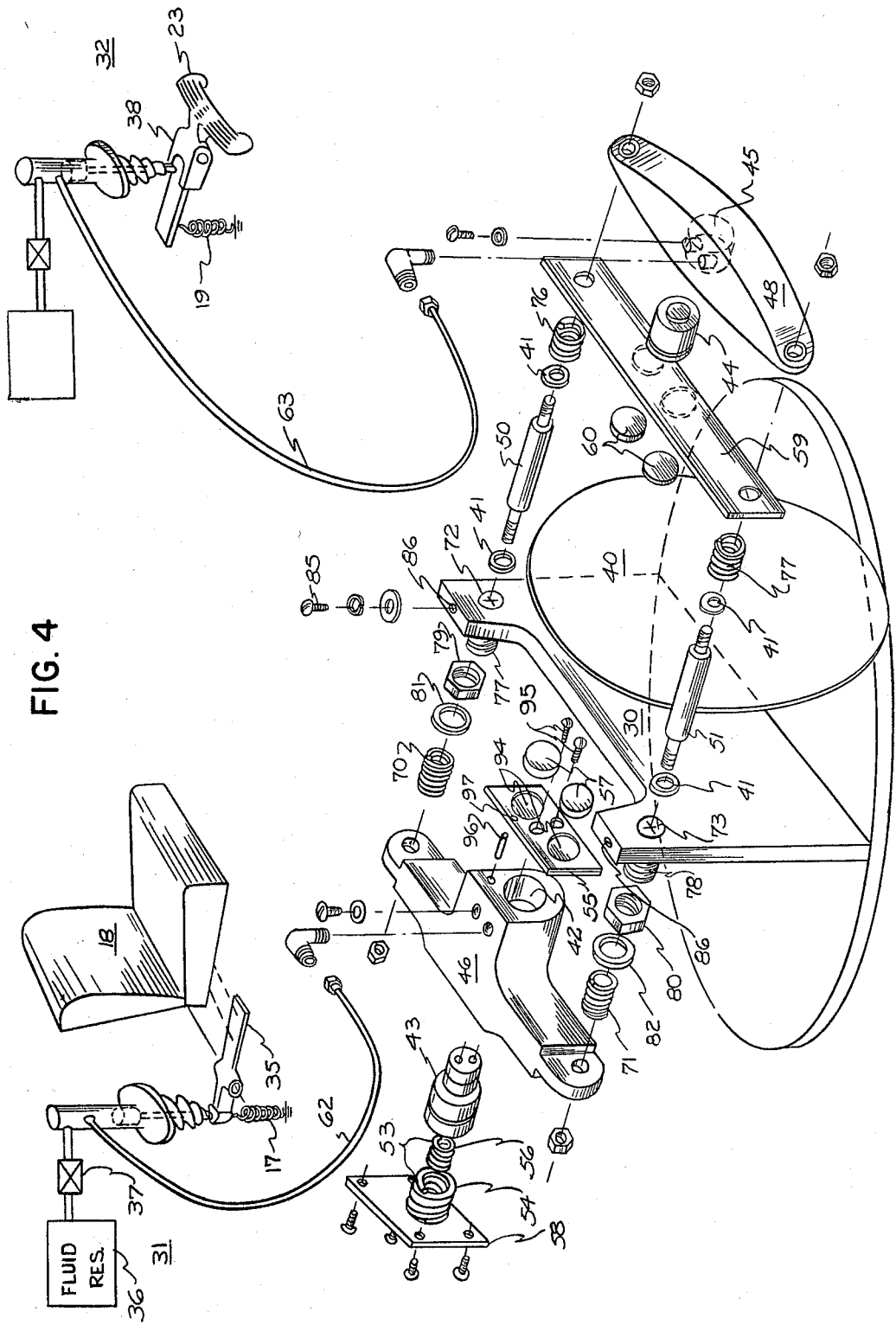

United States Patent Office 3,280,933
Patented Oct. 25, 1966

3,280,933
DISC BRAKE ARRANGEMENT FOR INDUSTRIAL TRUCKS
Robert E. Jones, Greene, N.Y., assignor to The Raymond Corporation, Greene, N.Y., a corporation of New York
Filed Oct. 16, 1964, Ser. No. 404,533
12 Claims. (Cl. 180—52)

The present invention relates to vehicle braking apparatus, and more particularly, to an improved braking arrangement for material handling vehicles and the like. Many material-handling vehicles, and especially "narrow-aisle" lift trucks, are constructed as compactly as possible, in order to facilitate maneuvering in small spaces. Such trucks commonly utilize drive assemblies comprising an electric motor geared to a drive wheel and a brake, with the entire drive assembly being mounted to rotate with respect to the body of the truck to steer the truck. It is desirable to make the brakes on such aesemblies as small as possible, in order to make the size of the drive assemblies themselves small, but the heavy loads carried by such trucks impose braking torque requirements and heat dissipation requirements which have limited the size to which such brakes can be reduced. As well as being compact, it is necessary that the brake on such a drive assembly be readily accessible for purposes of maintenance and repair, and further that the brake not interfere with access to the drive motor or other portions of the drive assembly. Because such motor-drive wheel brake assemblies usually rotate through large angles with respect to the body of the truck as the truck is steered, mechanical brake actuation is impractical, and hydraulic brakes connected to controls on the body of the truck by flexible hydraulic hoses are practically mandatory.

In the interests of safety, it is usually desirable that such vehicles be provided with both a parking brake capable of holding the vehicle motionless and an operating or service brake which may be varied by the truck operator to provide varied amounts of braking torque. For "fail-safe" operation, it is desirbale that the operating brake be spring-set and power released. In the prior art, a number of lift truck drive assemblies have utilized brake shoes arranged to act on a brake drum surface inside the drive wheel, with a hydraulic brake cylinder connected to the shoes to provide service or operational braking, and a push-pull cable (or Bowden wire) connected to the shoes to provide "parking" braking. Such systems are also common in automobiles. Because the drive assemblies of narrow-aisle lift trucks rotate through very large steering angles compared to the steerable wheels of automobiles, such lift truck drive assemblies sometimes have been provided with hollow stems through which the hydraulic line and push-pull cable are trained, in order that rotation of the drive assembly as the truck is steered not require a change in length of such connections. While use of such hollow stems does obviate the necessity that such lines change in length as the drive assembly rotates, the ends of such lines still must rotate with respect to each other, so that such lines are subjected to an undesirable torsional flexing as the truck is steered. Also, because allowable drive wheel diameter is limited, the brake drum diameter is also limited, sometimes making it difficult to provide the required amount of braking torque. Furthermore, such arrangements are disadvantageous in that the brake shoes are not readily accessible, so that the truck must be jacked up and the drive wheel must be removed in order to re-line or adjust such brakes. In addition, such drum brakes are enclosed by the wheel, undesirably limiting heat dissipation.

The present invention provides a much-improved drive assembly braking system in an arrangement which is compact and readily accessible. In the present invention a disc brake is provided on the drive motor shaft. Because the disc brake torque acts through the mechanical advantage of the drive assembly speed reduction gearing, less braking torque is required than in a system employing braking at the drive wheel. Because the disc brake is not enclosed by a drum, heat generated from braking is much more easily dissipated.

In order to provide both a "service brake" control and a "parking brake" control, it would be theoretically possible to provide two separate disc brake calipers operated by two independently-actuated hydraulic systems, but the space available for such steerable drive assemblies to narrow-aisle trucks prohibits such duplication of parts. Since the brake assemblies must rotate with the motor, the speed reduction gearing, and the drive wheel, as the truck is steered, any apparatus added to such an assembly requires a volume of space which may be much greater than the volume of the added apparatus itself. It is highly desirable, of course, to mount as much of the drive assembly as possible as near as possible to the drive assembly steering axis. Because of space limitations, as well as the steering angles involved, a number of braking systems which are useful in automobiles and various other vehicles are impractical in narrow-aisle lift trucks.

It is perhaps theoretically possible to use a single hydraulic piston-cylinder combination actuated by both a service brake hydraulic control line and a parking brake control line, but such systems are necessarily complex and unreliable, particularly if a "fail-safe" braking system is to be provided, since the hydraulic pressure from two such control lines undesirably interact, so that service brake operation affects parking brake operation, or vice versa, unless complex hydraulic systems are provided. The present invention overcomes such problems by provision of a unique single braking assembly which provides both the "service brake" and the "parking brake" functions in a fail-safe system. The invention employs a spring-set disc brake having a first hydraulic means operable upon actuation to over-ride the spring force to release a "parking brake" torque, and a second hydraulic means operable upon actuation of a service brake pedal to allow braking torque to be controlled or modulated during maneuvering of the truck. The two hydraulic actuators are mechanically intreconnected to clamp or unclamp the same sets of pads on a single brake disc, but the two hydraulic actuators are "independent" in the sense that operation of one does not affect operation of the other. Thus it is a primary object of the present invention to provide an improved material-handling vehicle drive assembly having an improved braking arrangement.

It is a further object of the invention to provide such an improved braking system in a fail-safe arrangement capable of being controlled by two separate hydraulic controls.

It is an important object of the invention to provide an improved braking system of a fail-safe type controlled by two separate controls wherein operation of one control does not adversely affect the operating characteristics of the other control.

If another very important object of the invention to provide an improved braking system having two hydraulic actuators which act upon the same brake pads and disc, in order to provide both braking functions with apparatus occupying a minimum amount of space.

It is a further object of the invention to provide a vehicle having combined dead-man braking and controllable service braking, wherein the dead-man braking means automatically assists the service braking means to provide additional braking torque when the operator attempts to provide extremely hard braking.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawings, in which:

FIG. 4 is an exploded view of the disc brake assembly of the present invention.

Figure 1:
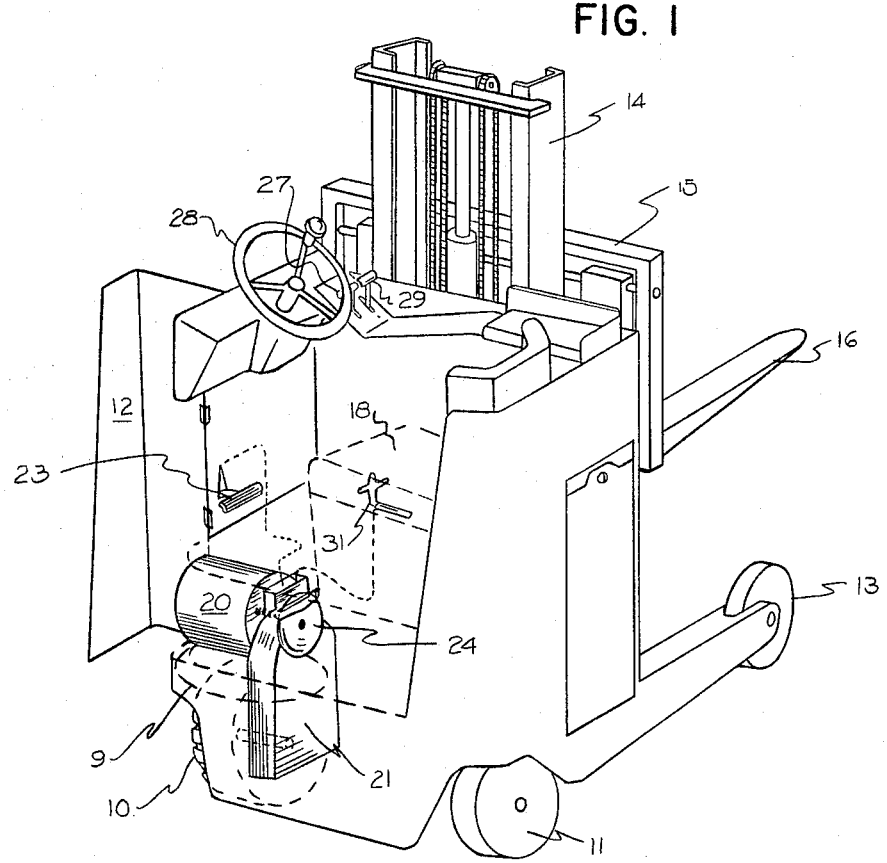
FIG. 1 is a perspective view of a material handling truck, with certain parts shown in phantom, and illustrating the installation of one form of the present invention in such a truck.

FIG. 1 shows a lift truck having a pair of rear steerable wheels 10 and 11, and a pair of front load-support wheels, only one (13) of which is visible in FIG. 1. The truck includes a mast 14 which carries a conventional load carriage 15, which in turn carries a pair of load forks, only one (16) of which is visible in FIG. 1. The truck includes one powered steerable drive wheel 10, a non-powered steerable wheel 11, and two non-steerable, non-powered load wheels. A seat 18 is provided to accommodate an operator. The truck of FIG. 1 incorporates a unique steering and suspension system of the type shown in commonly-owned appl. Ser. No. 392,529 filed August 27, 1964, by Christian D. Gibson, but it will be understood that the invention is applicable as well to many other types of vehicles.

The truck is propelled by a steerable drive assembly which comprises drive motor 20, speed reduction gearing 21, drive wheel 10, and a disc brake assembly 24 mounted to act on the shaft of drive motor 20. The entire steerable drive assembly is mounted to rotate as a unit about a vertical steering axis which passes through the center of drive wheel 10 and the axle of drive wheel 10. Motor 20, gear reduction unit 21, drive wheel 10 and braking assembly 24 all are mounted on rotatable bearing plate 9 (shown in phantom in FIG. 1), which plate is rotatably journalled in the main frame of the truck. In order that the rotatable drive assembly require a minimum volume beneath the truck, it will be seen to be important that brake assembly 24, which is attached to the shaft of motor 20, have minimum overall horizontal dimension.

In FIG. 1 a hinged access door 12 is shown swung open to provide access to the drive assembly for purposes of maintenance. Being mounted atop the drive assembly, disc brake assembly 24 is readily accessible when door 12 is opened, and being mounted openly, rather than inside a drive wheel, brake assembly 24 is capable of easily dissipating the heat generating during braking. Also, because the braking torque applied by assembly 24 acts through the gear ratio of speed reducer 21, much less torque is required than in a brake connected to act on the output side of the gear reduction unit.

The operator is provided with a plurality of controls including a steering wheel 28, directional (forward-reverse) control 27, and speed control 29. Provided beneath seat 18 is a piston-cylinder assembly 31 arranged to apply pressure to brake assembly 24 whenever an operator is seated in seat 18. The function of assembly 32 is to provide "dead-man" and "parking" control over brake assembly 24, to prevent truck travel if the operator falls or otherwise leaves seat 18, and to prevent the truck from rolling when left unattended. As will be described in detail below, brake assembly 24 is spring-set in the absence of an operator on seat 18, and the weight of an operator in seat 18 overcomes the spring force which tends to engage brake assembly 24, resulting in brake release. Truck directional (forward-reverse) control is effected by control lever 27, and drive motor torque is controlled by speed control 29. Service brake pedal 23 operates a further piston-cylinder assembly 32 (FIG. 4) to apply hydraulic pressure to brake assembly 24. As increased downward pressure is applied to pedal 23, increased braking torque is applied to the drive assembly by braking assembly 24.

Figure 2:
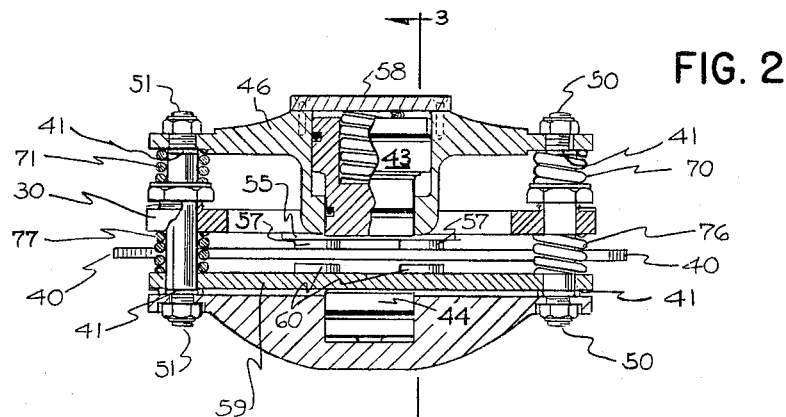
FIG. 2 is a top cross-section view of portions of a disc brake assembly constructed in accordance with the present invention.
Figure 3:
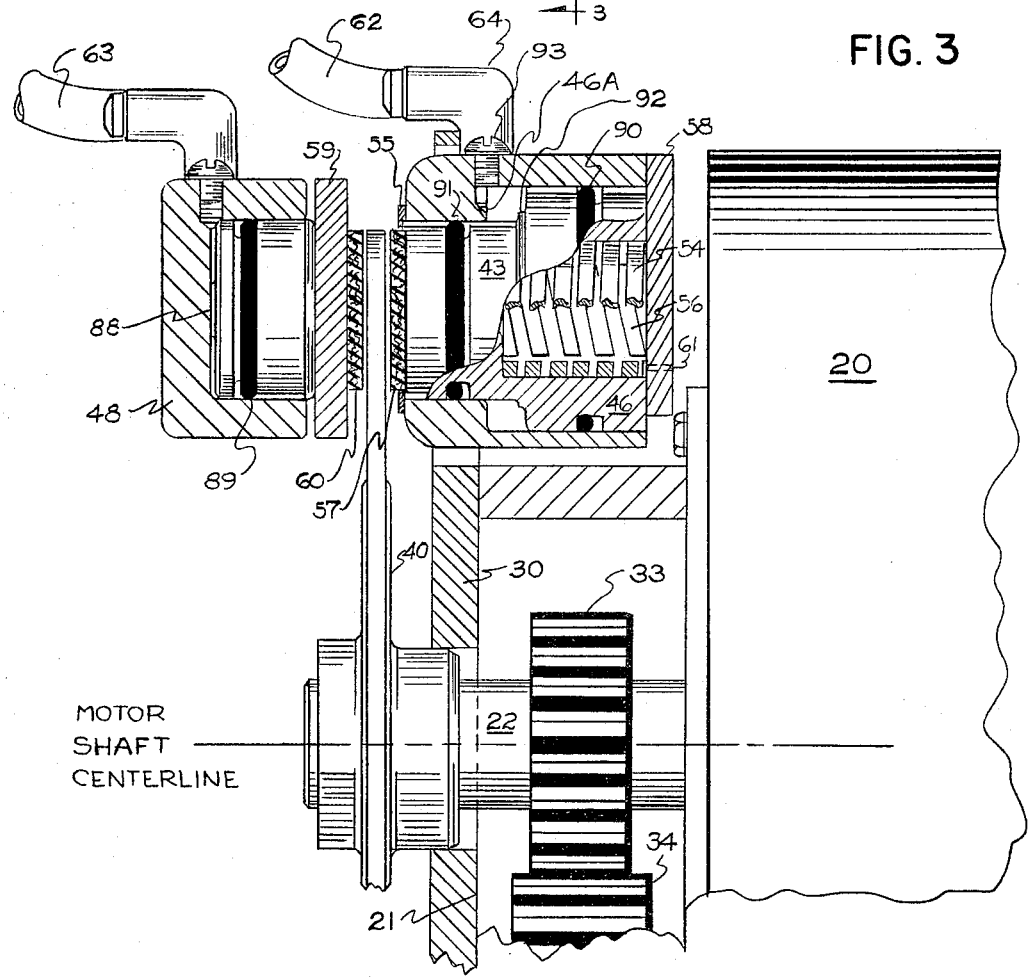
FIG. 3 is a cross-sectional view taken along lines 3—3 in FIG. 2, with further portions of the brake assembly added.

The structure of the improved brake assembly 24 is illustrated in more detail in FIGS. 2–4. The improved brake assembly 24 includes a fixed portion including mounting support 30 and rotatable disc 40, both of which are "fixed" insofar as translation with respect to drive assembly base plate 9 is concerned, although disc 40 does rotate, of course, as the drive motor operates. The brake assembly 24 also includes a movable portion having piston-cylinder assemblies which move axially and which press brake pads against rotatable disc 40, by moving axially along shaft 22 in mutually-opposite directions, to tend to clamp or to release disc 40. As seen in FIG. 3, shaft 22 of drive motor 20 passes through speed reduction gearing unit 21, which is bolted to motor 20, and shaft 22 carries rotatable braking disc 40 on its outer end. Pinion 33 on shaft 22 engages a further gear 34 in reduction unit 21, and through a speed reduction gearing train including further gears (not shown), the output shaft of gear reduction unit 21 is connected to drive wheel 10 (FIG. 1). For further details showing the mechanical connection of the drive assembly to the body of the truck, reference may be had to the above-mentioned Gibson application. As is evident from FIG. 3, much of the brake assembly is located directly above gear reduction unit 21 and below the level of the top of motor 20, so that locating the braking assembly and the braking disc in the positions shown increase the horizontal and vertical dimensions of the rotatable drive assembly by very modest amounts, which is extremely important in order to preserve the compactness of a narrow-aisle lift truck.

While the disc is mounted directly on a motor shaft which rotates at the same speed as the motor armature in the specific embodiment shown, it is also within the scope of the invention instead to locate the braking disc on an intermediate shaft in the gearing train, so that the disc rotates at a fraction of motor armature speed, but at a speed still substantially greater than drive wheel speed. Mounted on both sides of disc 40 is the movable portion 26 of brake assembly 24, including a first piston-cylinder assembly 42, 43 in cylinder housing 46 and a second piston-cylinder assembly 44, 45 in housing 48, the two piston-cylinder assemblies being mounted on opposite sides of disc 40.

As seen in FIG. 2 and the exploded view of FIG. 4, housings 46 and 48 containing cylinders 42 and 45, respectively, are spaced at a fixed distance from each other by means of slide shafts 50 and 51, the ends of which are threaded to accommodate nuts which hold housings 46 and 48 on slide rods 50 and 51 when the device is assembled, as shown in FIG. 2. The distance between housings 46 and 48 will be seen to be adjustable by substitution of different shims for shims 41, 41. Such adjustment is sometimes necessary when the brake pads become worn thin. Slide shafts 50 and 51 slidingly pass through holes 72, 73 in fixed mounting plate 30.

Mounted within cylinder 42 of housing 46 is a spring means 53 shown as including a pair of nested springs 54 and 56, which act between removable back plate 58 on housing 46 and piston 43 within cylinder 42 of housing 46. As shown in FIGS. 2 and 3, piston 43 is partially hollow, so that the entire length of spring means 53 lies within the hollowed portion of piston 43 when piston 43 is at its rightward limit as viewed in FIG. 3. When the device is assembled, springs 54 and 56 are partially compressed.

In the absence of operator weight on seat 18, and in the absence of foot pressure on pedal 23, spring means 53 urges piston 43 toward disc 40, so that shoe plate 55, which is attached to piston 43 and which carries pads 57, 57, presses pads 57 against disc 40. As shown in FIG. 4, fixed support plate 30 is partially cut away to allow piston 43, plate 55 and pads 57 to move past plate 30 to where pads 57 will engage the side of disc 40. The reaction of spring means 53 against plate 58, which is rigidly screwed to housing 46, tends to urge housing 46 away from disc 40, and this force is transmitted via slide shafts 50 and 51 to housing 48 on the opposite side of disc 40, thereby tending to pull housing 48 toward disc 40. Pulling housing 48 towards disc 40 causes piston 44 to urge bar 59, which carries pads 60, 60, toward disc 40, thereby pressing pads 60 against disc 40. Thus pads 57, 57 and 60, 60 frictionally engage opposite sides of disc 40 and provide a braking torque, the amount of which depends upon the spring force of spring means 53. The dimensions and spring constant of spring 53 are selected with respect to the other dimensions of the assembly so that spring means 53 is precompressed sufficiently during assembly that the spring force clamps pads 57 and 60 tightly enough against disc 40 to provide sufficient braking force for "dead-man" or "parking" braking. By using a pair of nested springs 54 and 56 acting in parallel rather than a single spring, the required spring force necessary to provide adequate dead-man and parking braking may be obtained with springs wound with much smaller diameter spring wire than otherwise, both making the springs easier to fabricate and also providing a greater spring operating range, since there is more space between the adjacent turns of the two lighter springs than there would be between adjacent turns of a single spring having equivalent force but wound with heavier wire.

As indicated schematically in FIG. 4, weight on seat 18 acting against the force of spring 17 pivots a lever 35 which moves a piston upwardly in piston-cylinder unit 31. A conventional hydraulic fluid reservoir 36 is connected via a check valve 37 to unit 31 to replenish any fluid which may leak from the system. When the weight of the operator is applied to seat 18, hydraulic pressure is applied from piston-cylinder assembly 31 via hydraulic pressure hose 62 to cylinder 42 in housing 46, to the side of piston 43 opposite spring means 53, so that the hydraulic pressure operates against the force of spring means 53, thereby urging piston 43, plate 55 and pads 57 away from disc 40 as the pressure applied to cylinder 42 overcomes the spring force of precompressed spring means 53. With no reaction force urging housing 46 away from disc 40, there is, of course, no force transmitted through shafts 50, 51 to pull opposite housing 48, toward disc 40, and hence the application of the hydraulic pressure from seat-operated assembly 31 removes the pressure with which pads 60 were therefore pressed against disc 40. Thus it will be seen that application of operator weight to seat 18 automatically over-rides the force of spring means 53, thereby removing braking torque from disc 40, allowing the truck to travel as soon as the operator moves control 29 to energize drive motor 20. However, if the operator should fall, or otherwise leave seat 18, the lowering of hydraulic pressure in hose 62 immediately will allow spring means 53 to expand to brake disc 40, thereby providing effective "dead-man" and "parking" braking. As will be explained in detail, when pressure is applied to line 62, so that pads 57 (and pads 60) are no longer spring-urged against disc 40, a centering spring system will operate to shift the movable portion 26 of brake assembly 24 relative to the fixed portion 25, to a position where the pads on opposite sides of disc 40 are substantially equidistant from the sides of disc 40, so that one set of pads will not rub against disc 40 when the brake is in a "released" condition.

During normal maneuvering, the operator's weight remains on seat 18, of course, so that assembly 31 and hose 62 continue to apply pressure to cylinder 42, preventing spring means 53 from applying braking forces to disc 40. In order to provide selective, substantially smooth or proportional braking during normal maneuvering by means of service brake pedal 23, piston-cylinder assembly 32 is actuated by application of foot pressure on pedal 23 to apply hydraulic pressure via hose 63 to cylinder 45 in housing 48. As shown schematically in FIG. 4, foot pressure on pedal 23 pivots a lever member 38 (against the force of a spring 19) moving a piston upwardly in piston-cylinder unit 32, thereby applying pressure via hose 63 to cylinder 45. As pressure is applied to cylinder 45, piston 44 first urges bar 59 and pads 60 toward disc 40. After pads 60 bear against disc 40, further increase in pressure in cylinder 45 urges hydraulic cylinder housing 48 away from disc 40, and slide shafts 50, 51 transmit pulling forces to housing 46, thereby urging housing 46, piston 43 and pads 57 toward and against disc 40. During such operation, cylinder 42 remains pressurized, of course, due to the presence of the operator on seat 18. The amount of force with which pads 57 and 60 are urged against disc 40 during such operation will be seen to be directly proportional to the force applied by the operator to the foot pedal. It may be noted that the pressure applied to cylinder 45 is completely independent of the pressure applied to opposite cylinder 42, and even though cylinder 42 is pressurized, the pressure in cylinder 42 in no way affects the controlled amount of pressure being applied by piston-cylinder 44–45 in cylinder housing 48.

A further advantageous feature of the invention is a form of automatic "power assist" inherent in the arrangement shown. If the seated operator desires to make an extremely quick stop, and he pushes downwardly very forcefully on pedal 23, he automatically tends to raise his weight from seat 18, resulting in a reduction of pressure in cylinder 42, so that spring means 53 tends to aid piston-cylinder assembly 44, 45 to apply even stronger braking forces.

As best seen in FIG. 2 and in the exploded view of FIG. 4, housing 46 containing cylinder 42 and piston 43 is resiliently spaced from fixed supporting plate 30 by means of centering springs 70, 71 carried on slide rods 50, 51, respectively, and similarly, bar or plate 59 is resiliently spaced from fixed supporting plate 30 by means of centering springs 76 and 77. Slide shafts 50 and 51, which rigidly interconnect housing 46 and 48, slidingly pass through holes 72 and 73 in fixed support plate 30. With spring means 70, 71 urging the two rigidly interconnected housings (46, 48) leftwardly (as viewed in FIG. 4), and with spring means 76, 77 urging the two housings rightwardly, it will be seen that the two pair of spring means oppose each other, establishing the position of the translatable portion 25 of brake assembly 24 with respect to axially-fixed disc 40 at a neutral position in which the force of springs 70, 71 balances the force of springs 76, 77. The forces of springs 70, 71 and 76, 77 are adjusted so that the pads on opposite sides of disc 40 lie substantially equal distances away from disc 40 when the brake assembly is in a released condition, but so that the brake assembly may slide either rightwardly or leftwardly against the force of one or the other of the pairs of centering springs when braking is applied, allowing the pads on both sides of the disc to engage the disc with approximately equal frictional force, even if the pads on one side of the disc are worn more than those on the other side. Because centering springs 70, 71, 76 and 77 only act to slide the assembly with respect to fixed mounting support 30 and the fixed axial position of disc 40, the forces which the centering springs need provide may be extremely small compared to the forces applied by pistons 43 and 44, and the force required for movement of assembly 25 requires no significant increase in force from either spring means 53 or either hydraulic piston.

As shown in FIG. 4, a pair of lubricating passages 86, 86 are drilled in fixed mounting member 30 to communicate with bores 72 and 73, and such passages may be tapped to accommodate screws (such as 85) to close passages 86. The washers on such screws also prevent rotation of adjustment nuts 79 and 80, the functions of which are described below. Hydraulic pressure is applied via hose 62 and connector 64 into cylinder 42 of housing 46, to the side of piston 43 opposite to spring means 53, as best seen in FIG. 3, so that piston 43 is urged rightwardly as viewed in FIG. 3, and in FIG. 3 piston 43 is shown urged to its rightward limit. Piston 43 is provided with a rear portion having a diameter larger than the forward portion of the piston, and it will be recognized that the effective piston area is the difference in cross-sectional area between the two portions of the piston. Conventional O-rings 90 and 91 are provided in grooves near the rear and the front of piston 43 to minimize hydraulic fluid leakage between piston 43 and cylinder housing 46, and hole 61 through back plate 58 is provided to vent that portion of housing 46 to the rear of piston 43, so that any fluid which might leak past O-ring 90 will be drained rather than accumulating to a point where it could interfere with rightward motion of piston 43. A shoulder 92 intermediate the two sections of piston 43 acts as a stop against front inside wall 46a of housing 46, limiting the leftward translation of piston 43, so that piston 43 cannot travel sufficiently far leftward to block the introduction of hydraulic pressure to cylinder 42 of housing 46. A tapped hole shown closed by screw 93 serves as a bleed hole, to allow air to be purged from inside the cylinder.

As better seen in FIG. 4, shoe plate 55 is rigidly attached (as by means of screws 94) to the reduced diameter portion of piston 43 which extends out from housing 46, and brake pads 57, 57 are cemented in circular recesses 94 provided in plate 55. In order that frictional engagement with disc 40 not rotate plate 55, guide pin 96 extending forwardly from housing 46 extends through hole 97 in plate 55, allowing plate 55 to reciprocate but not rotate.

In FIG. 3, piston 44 is also shown in a maximum retracted position. Piston 44, unlike piston 43, lies wholly to one side of the cylinder chamber in housing 48, and hence a single O-ring 89 is provided in a groove on piston 44. A raised boss 88 on piston 44 limits leftward travel of piston 44, to insure minimum volume of fluid within housing 48. Bleed screw 93 is provided for purging of housing 48. The end of piston 44 extending outwardly from housing 48 bears against shoe plate 59.

In order to allow adjustment of the spring neutral position of the movable portion 26 of brake assembly 24, the spring forces of centering springs 70 and 71 are made adjustable, as is best seen in FIGS. 2 and 4. Externally threaded hollow bosses 77 and 78 brazed on mounting plate 30 accommodate hexagonal adjustment nuts 79 and 80. Adjustment of nuts 79 and 80 will be seen to tend to compress or relax springs 70 and 71, resulting in movement of the entire movable portion 26 of brake assembly 24 to a different neutral position. By adjustment of nuts 79, 80, the system neutral position may be adjusted so that the pads on opposite sides of the disc 40 are equidistant from their respective sides of disc 40. Nuts 79 and 80 are used to make fine adjustments to balance the distance of the pads on one side of the disc against that of the pads on the other side. If the pads become considerably worn, to where extreme piston displacements are required for the pads to engage disc 40, shims 41 may be removed, or thinner shims substituted, to move the pads on both sides of disc 40 in toward disc 40. Washers 81 and 82 provide flat surfaces adjacent the inner ends of springs 70, 71 to prevent nuts 80 and 81 from snagging the end turns of springs 70, 71 and to provide proper diameter seats for the inner ends of springs 70, 71. The diameters of holes 72 and 73 are desirably made very slightly oversize to allow slide rods 50 and 51 to angularly rock a small amount, a bore of two or three thousandths of an inch oversize being typical for shafts 50, 51 having a .500-inch diameter. Providing slightly oversize bores at the fixed mounting plate allows the entire movable braking assembly to adjust itself slightly in case the planes of the sides of disc 40 are not exactly perpendicular to the bores. It will be seen that adjustment of nuts 79 and 80 by slightly different amounts will cause a slight canting one dimension of the brake assembly relative to the planes of the sides of disc, and the slightly oversized bores for slide shafts 50, 51 also allow the assembly to rock slightly in a second perpendicular direction, thereby allowing the brake pad surfaces to better align themselves with the sides of disc 40 to provide maximum area of frictional contact when braking is applied.

While FIG. 4 shows the balance between spring pair 70, 71 and spring pair 76, 77 being effected by adjusting the compression of springs 70 and 71, it should be apparent at this point that threaded hubs 77, 78 and adjustment nuts 79, 80 could instead be placed on the opposite side of mounting plate 30 to adjust the compression of springs 76, 77, and indeed, such adjustments could be provided on both pairs of springs if desired.

It will thus be seen that the objects set forth above, among those made apparent from the preceding description, are efficiently attained, and since certain changes may be made in the above construction without departing from the scope of the invention, it is intended that all matter contained or shown in the accompanying drawings shall be interpreted as illustrative and not in a limiting sense.

Having described my invention, what I claim as new and desire to secure by Letters Patent is:

1. A material-handling vehicle, comprising, in combination: a frame supported by a plurality of wheels, at least one of said wheels comprising a powered steerable wheel carried on a drive assembly rotatably journalled in said frame, said drive assembly comprising a base member, a motor having an output shaft fixedly mounted on said base member, a speed reduction gearing assembly and a braking disc attached to said output shaft of said motor, and a braking assembly resiliently mounted on said base member, said braking assembly comprising first and second hydraulic piston-cylinder assemblies disposed on opposite sides of said braking disc, said piston-cylinder assemblies comprising a first piston mounted within a first cylinder member and a second piston mounted within a second cylinder member; rigid mechanical connection means interconnecting said cylinders to space said cylinders at a fixed distance from each other; first brake pad means disposed between said first piston and said disc and connected to be urged by said first piston toward a first side of said disc; compression spring means connected to act between said first piston and said first cylinder member to urge said first brake pad means toward said first side of said disc; a second brake pad means disposed between said second piston and said disc to be urged toward the opposite side of said disc; first means for applying hydraulic pressure to said first cylinder member to compress said spring means; and second means for applying hydraulic pressure to said second cylinder member.

2. Apparatus according to claim 1 having an operator's station mounted on said frame and in which said first means for applying hydraulic pressure comprises means responsive to the presence of an operator at said station for providing a hydraulic pressure, and a flexible hydraulic hose connected to apply said hydraulic pressure to said first cylinder.

3. Apparatus according to claim 1 having an operator-actuable brake control mounted on said frame and in which said second means for applying hydraulic pressure comprises means responsive to actuation of said brake control for providing a hydraulic pressure, and a flexible hydraulic hose connected to apply said hydraulic pressure to said second cylinder.

4. Apparatus according to claim 1 having mutually oppositely-acting first and second centering spring means for resiliently mounting said braking assembly on said rotatable base member, said first centering spring means acting to urge said braking assembly in one direction along a line perpendicular to the plane of said disc, said second centering spring means acting to urge said braking assembly in the opposite direction along said line; and means for adjusting the relative forces of said first and second centering spring means.

5. Apparatus according to claim 1 in which said compression spring means comprises first and second helical compression springs located within said first cylinder member, said first compression spring being wound in a helix of larger diameter than that of said second compression spring, said second compression spring being nested within said first compression spring.

6. A material-handling vehicle, comprising, in combination: a frame supported by a plurality of wheels, at least one of said wheels comprising a powered steerable wheel carried on a drive assembly rotatably journalled in said frame, said drive assembly comprising a rotatable base plate, a motor fixedly mounted on said base plate and having an output shaft, a speed reduction gearing assembly and a braking disc attached to said output shaft of said motor, said powered steerable wheel being connected to be driven by said motor through said gearing assembly, and a braking assembly mounted on said base plate, said braking assembly including first and second hydraulically-separate and mechanically-interconnected hydraulic actuating means for applying braking forces to said braking disc, means including an operator-controllable first control means for applying hydraulic pressure through a flexible hydraulic hose to said first hydraulic actuating means, and a second means for applying hydraulic pressure to said second hydraulic actuating means.

7. Apparatus according to claim 6 in which said motor is mounted above said rotatable base plate, in which said powered steerable wheel is mounted below said base plate, and in which said speed reduction gearing assembly extends both above and below said base plate, said gearing assembly having an input means connected to be driven by said shaft of said motor and an output means connected to drive said powered steerable wheel.

8. Vehicle braking apparatus, comprising, in combination: a base structure; shaft means journalled in said base structure; a rotatable disc carried on said shaft means; first and second hydraulic piston-cylinder assemblies disposed on opposite sides of said disc, said assemblies comprising a first piston mounted within a first cylinder member and a second piston mounted within a second cylinder member; rigid mechanical connection means interconnecting said cylinder members to limit the distance between said cylinder members to a predetermined maximum amount; a first brake pad connected to be urged by said first piston toward a first side of said disc; first compression spring means connected to act between said first piston and said first cylinder member to urge said first brake pad toward said disc; a second brake pad connected to be urged by said second piston toward the opposite side of said disc; second spring means connected to act between said base structure and said first cylinder member; third spring means connected to said base structure to urge said second pad away from said disc; first means for applying hydraulic pressure to said first cylinder member to compress said first spring means; and second means for applying hydraulic pressure to said second cylinder member.

9. Apparatus according to claim 8 in which said first means for applying hydraulic pressure comprises an operator's seat and means for providing hydraulic pressure in response to the presence of substantial weight on said seat; and in which said second means for applying hydraulic pressure comprises a foot pedal located below the level of said seat so that an operator seated in said seat tends to shift his weight from said seat to said pedal as he depresses said pedal, and means for applying hydraulic pressure in response to the application of pressure to said foot pedal.

10. Apparatus according to claim 8 in which said first compression spring means is located within said first cylinder member.

11. Apparatus according to claim 8 having means for adjusting the balance between the spring forces of said second spring means and said third spring means.

12. Apparatus according to claim 8 in which said rigid mechanical connection means includes two shafts each slidingly mounted on said base structure and connected to said first and second cylinder members.

References Cited by the Examiner

UNITED STATES PATENTS

| | | | |
|---|---|---|---|
| 2,044,944 | 6/1936 | House | 188—109 |
| 2,778,456 | 1/1957 | Ross | 188—170 |
| 2,840,193 | 6/1958 | Mann et al. | 188—73 |
| 2,950,773 | 8/1960 | Ulinski | 180—26 |
| 2,957,533 | 10/1960 | Lewis et al. | 180—52 X |
| 3,005,522 | 10/1961 | Butler | 188—73 |
| 3,179,198 | 4/1965 | Hastings | 188—170 X |
| 3,211,248 | 10/1965 | Qualye | 180—13 |

KENNETH H. BETTS, *Primary Examiner.*